United States Patent [19]

Zievers

[11] Patent Number: 4,960,448
[45] Date of Patent: Oct. 2, 1990

[54] HIGH TEMPERATURE GAS FILTER

[75] Inventor: Elizabeth C. Zievers, LaGrange, Ill.

[73] Assignee: Universal Porosics, Inc., LaGrange, Ill.

[21] Appl. No.: 421,675

[22] Filed: Oct. 16, 1989

[51] Int. Cl.⁵ .............................................. B01D 46/02
[52] U.S. Cl. ........................................ 55/523; 55/302; 55/341.1; 55/502; 55/508
[58] Field of Search ...................... 55/302, 341.1, 502, 55/508, 523, DIG. 30

[56] References Cited

U.S. PATENT DOCUMENTS

| | | | |
|---|---|---|---|
| 2,892,510 | 6/1959 | Wygnnt | 55/523 X |
| 4,735,638 | 4/1988 | Ciliberti et al. | 55/302 |
| 4,764,190 | 8/1988 | Israelson et al. | 55/523 X |
| 4,902,319 | 2/1990 | Kato et al. | 55/523 |
| 4,904,287 | 2/1990 | Lippexy et al. | 55/302 |

*Primary Examiner*—Charles Hart
*Attorney, Agent, or Firm*—Edmond T. Patnaude

[57] ABSTRACT

A high temperature pressure filter utilizes a rigid ceramic support plate separating a pressure tank into respective inlet and outlet pressure chambers. The support plate has a hole therein and a hollow ceramic filter element is disposed in one of the pressure chambers and mounted to the support plate over the hole therein.

8 Claims, 2 Drawing Sheets

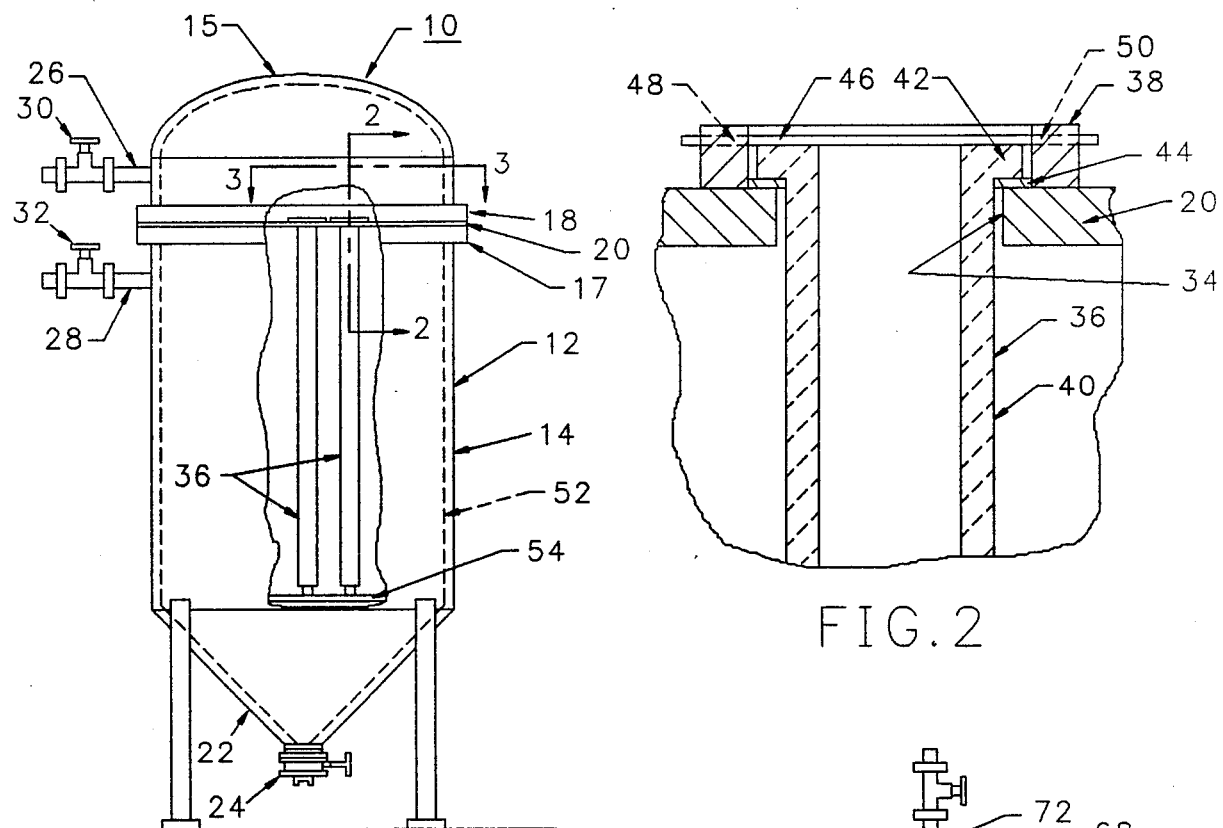
FIG. 2
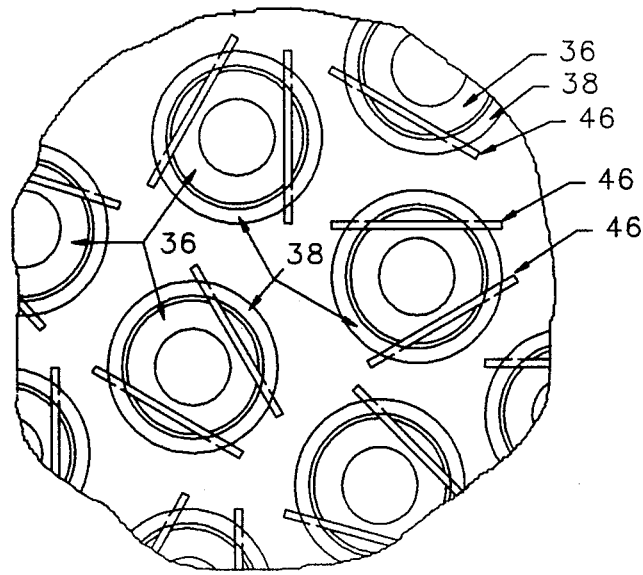
FIG. 1
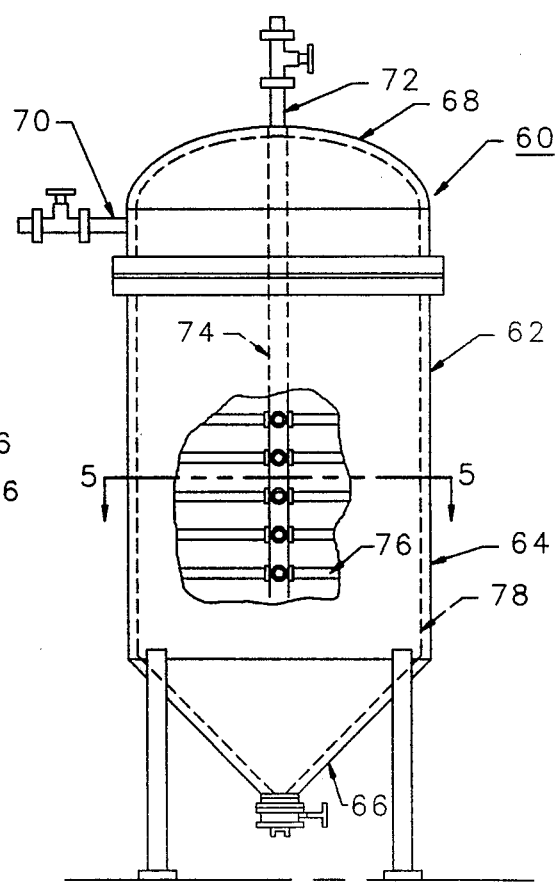
FIG. 3
FIG. 4

STANDING DESIGN

HIGH TEMPERATURE GAS FILTER

The present invention relates in general to filters which are used in the filtration of high temperature gas such as flue gas, and it relates more particularly to a new and improved filter construction which is well suited for use with high temperature gasses.

BACKGROUND OF THE INVENTION

A major problem in the design of pressure filters for use in high temperature applications is the maintenance of gas-tight seals between the inlet and outlet sides of the filter elements at the elevated operating temperatures. Filters must be fabricated and maintained at room temperatures, but the seals must remain effective as the temperature within the filter increases to a high level of say 1650 degrees F. or more. In addition, the different parts of the filter known in the prior art have been made of different materials which extend and contract by substantially different amounts as the respective temperatures vary. For example, where ceramic filter elements are supported by metallic structures special seals, such as described in U. S. Pat. No. 4,713,174, must be provided to maintain the integrity of the gas-tight seals. Where the filter elements are tubular and supported by a metal plate which separates the inlet and outlet sides of the associated filter tank, the support plate must be extremely thick, several inches, so as to support the weight of the filter elements when the support plate is at an elevated temperature. Moreover, such a plate exhibits substantial expansion between room temperature and the elevated operating temperatures. By way of example, a 304 stainless steel circular plate having a diameter of one-hundred ten inches at 70 degrees F. has a diameter of nearly one-hundred twelve inches at a temperature of 1,670 degrees F. Because of this substantial dimensional change, it has been necessary to provide special sealing structures, such, for example, as corrugated metal diaphragms, between the edges of the plates and the filter tanks to prevent the gas from passing around the edge of the plate from one side to the other.

SUMMARY OF THE INVENTION

Briefly, there is provided in accordance with the present invention a new and improved filter construction in which ceramic filter elements are supported by a ceramic support member having the same thermal coefficient of expansion as that of the filter elements. As a consequence, many of the problems which resulted in the past from the difference in expansion of the filter elements and the metallic support to which they are sealably connected and which have heretofore been difficult and expensive to solve have been eliminated. Moreover, since ceramic does not expand to any significant extent as the temperature increases the problems associated with the expansion of the support member relative to the associated filter tank have also been eliminated.

In one embodiment of the invention a ceramic support takes the form of an apertured plate from which ceramic filter tubes or candles, as they are sometimes called, depend. Since neither the ceramic plate nor the refractory lined filter tank undergoes any substantial dimensional change during operation of the filter at temperatures of 1600 degrees or more, a rigid seal can be provided between the tank and support sheet.

Preferably, the ceramic support member and the filter elements are formed of a ceramic impregnated fibrous ceramic material which is light in weight. Where the filter element support member separates the inlet and outlet sides of the filter, it must be non-porous. However, even if the filter element support member initially has a small degree of porosity, the pores will be quickly closed by the particulates entrained in the gas after the filter is first put on line.

GENERAL DESCRIPTION OF THE DRAWINGS

Further objects and advantages and a better understanding of the present invention will be had by reference to the following detailed description taken in connection with the accompanying drawings wherein:

FIG. 1 is an elevational view, partly broken away, of a pressure filter embodying the present invention;

FIG. 2 is a fragmentary sectional view taken along the line 2—2 of FIG. 1;

FIG. 3 is a fragmentary view taken along the line 3—3 of FIG. 1;

FIG. 4 is an elevational view, partly broken away, of a pressure filter embodying another aspect of the present invention;

DETAILED DESCRIPTION OF A PREFERRED EMBODIMENT OF THE INVENTION

Figure 5:
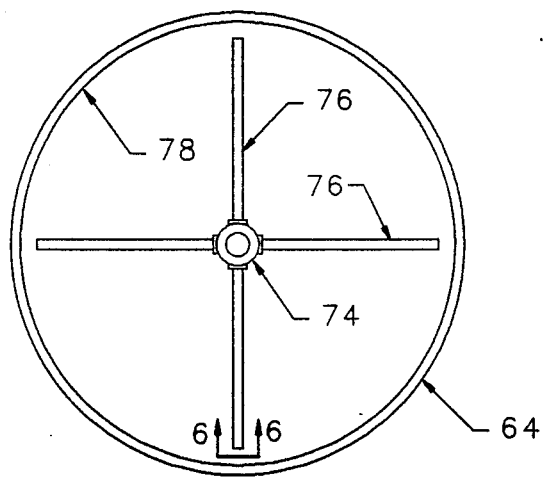
FIG. 5 is a cross-sectional view of the filter shown in FIG. 4 taken along the line 5—5 thereof.

Referring to FIG. 1, there is shown a pressure filter 10 including a tank 12 which includes a cylindrical body section 14 and a cover 15 which is removably and sealably secured to the body section 14 in the usual manner by suitable means such as bolts, not shown. The body section 14 includes an external annular flange 17 at the top and the cover 15 includes an external annular flange 18 at the bottom. Mounted between the flanges 17 and 18 is a circular filter tube support plate 20 which separates the chamber within the tank 12 into inlet and outlet chambers located above and below the support plate 20. A generally conical sump section 22 is permanently affixed as by welding to the bottom of the section 14 and a suitable drain valve 24 is provided over a drain port at the bottom. Inlet and outlet ports including valves 30 and 32 respectively open into the upper chamber within the cover 15 and the lower chamber within the body section 14 and the sump section 22.

The support plate 20 is provided with a plurality of circular openings 34, one of which is shown in FIG. 2, through which a plurality of tubular filter elements 36 depend into the lower chamber within the section 14 of the filter. A plurality of rings 38 extend upwardly from the top surface of the support plate 20 surrounding each of the holes 34 as best shown in FIG. 2 and 3. The rings 38 are bonded to the plate 20 or they may be an integral part thereof. The filter elements 36 are identical and each one has a tubular body portion 40 which is open at the top and closed at the bottom. An integral external annular flange 42 surrounds the opening at the top of each filter element 36. The body section 40 has an external diameter which is less than that of the internal diameter of the holes 34 in the support plate 20, and the external diameter of the flanges 42 exceeds the diameter of the hole 34 wherefore the flange 42 overlies the top surface of the support plate 20 to support the filter element 36 thereon. An annular flat sealing gasket 44 is positioned between the shoulder on the bottom of the flange 42 and the top surface of the support plate 20. The gasket 44 is maintained under compression by means of a pair of rods 46 which extend through respectively aligned holes 48 and 50 in the ring 38 across the top of the filter 36 in abutment therewith. The rods 46 are solid ceramic members, and as best shown in FIG. 3 two of the rods 46 and two pairs of the associated holes 48 and 50 are provided for each of the tubes 36. Preferably, the gasket 44 is formed of a material which has a positive coefficient of thermal expansion so as to expand as the temperature in the filter increases whereby assembly of the filter tubes to the sheet 20 is facilitated while a gas-tight seal is assured at the high operating temperatures.

The interior walls of the filter tank 12 are lined with a ceramic refractory material 52 so that the temperature of the tank 12 remains substantially less than the temperature within the filter when gases at a temperature of 1600 degrees F. or higher are passed through the filter between the inlet and outlets 26 and 28. For example, the tank may be at a temperature of 350 degrees F. while gas at a temperature of 1670 degrees F. is being filtered.

It will be understood that the gas to be filtered may be pumped into the filter through either of the ports 26 or 28 depending on whether the particles which are entrained in the gas are to be collected on the inside surfaces or on the outside surfaces of the filter elements 36.

In accordance with an important feature of the present invention, the support plate 20 is a ceramic member having the same thermal coefficient of expansion as that of the ceramic filter elements 36. The body portion 40 of the filter elements are porous while the support plate 20 is preferably non-porous. In a preferred embodiment of the invention both the support plate and the filter elements 36 are constituted by a mat of ceramic fibers which is impregnated with a ceramic material. The advantage in using this material for both the filter 36 and the support plate 20 is that the parts are relatively light in weight wherefore a large number of the filter tubes 36 can be supported by the ceramic support plate 20.

If desired, and depending upon the number of tubes 32 being used and the combined weights thereof, a bottom support grid 54, which extends across the lower end of the section 14, is fixedly supported in the tank and engages the bottom ends of the filter element 36 to provided added support therefor. The support assembly 54 is also formed of the same material as the support plate 20 and the filter tubes 36 so that there is no significant expansion of any of these parts as the temperature within the filter increases from room temperature to temperatures in excess of 1600 degrees F.

Referring to FIG. 4 there is shown an alternative embodiment of the invention which is incorporated in a filter 60 which includes a tank 62 formed of a hollow cylindrical section 64, a conical lower section 66 and a removable cover section 68. Valved inlets and outlets 70 and 72 open into the filter. The port 70 opens into the chamber within the cover and the port 72 opens into a vertically disposed ceramic support tube 74 from which a plurality of tubular filter elements 76 extend in radial directions in horizontal planes. The entire tank 62 is lined with a ceramic refractory material 78 to maintain the temperature of the tank 62 at a tolerable temperature of say 350 degrees F. during operation of the filter.

Figure 6:
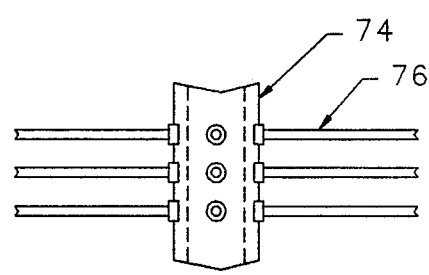
FIG. 6 is an elevational view taken as seen the line 6—6 in FIG. 5.

Reference to FIGS. 5 and 6 will facilitate an understanding of the manner in which the filter elements 76 are connected to the support tube and to the manifold 74. The bottom of the tube 74 is closed, and during operation of the filter hot gas flows through the filter elements and the support tube 74 between the ports 70 and 72. The filter elements 76 may be mounted to the tube 74 in the same manner as the tubes 36 are mounted to the support plate 20 as shown in FIG. 2 or by any other suitable means wherein the tubes are mechanically and sealably mounted in fixed positions to the tube 74.

Figure 7:
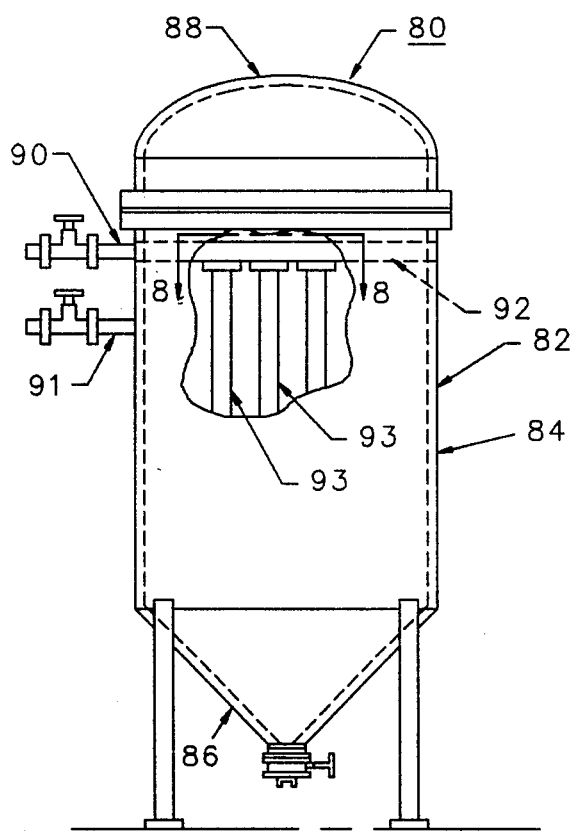
FIG. 7 is an elevational view, partly broken away, of a filter embodying another aspect of the present invention.
Figure 8:
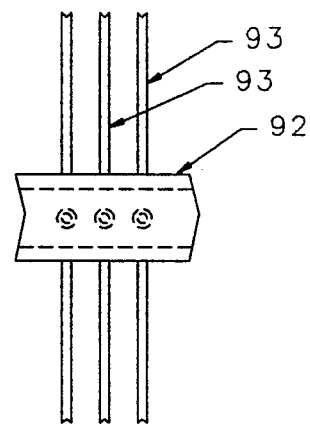
FIG. 8 is a cross-sectional view taken along the line 8—8 of FIG. 7.

Referring to FIG. 7 there is shown another embodiment of the invention wherein a filter 80 includes a pressure tank 82 made up of a cylindrical body section 84 having a conical sump section 86 permanently attached as by welding to the bottom thereof and a cover section 88 which is removably mounted over the top of the body section 84. The entire tank is lined with a refractory material. Valved inlet and outlet ports 90 and 91 open into the chamber. The port 92 may be seen to open into the body section 84 and the port 90 opens into a tubular support member 92 from which a plurality of tubular filter elements 93 depend. The filter elements may be hollow tubular filter elements or they may be hollow filter leaves. In either case, however, the manifold support tube 92 extends in a horizontal direction and the filter elements 93 extend in a vertical direction. The support member 92 and the filter elements 93 are ceramic members.

Figure 9:
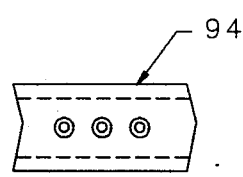
FIG. 9 is a fragmentary plan view of a filter tube and support assembly embodying another feature of the present invention.
Figure 10:
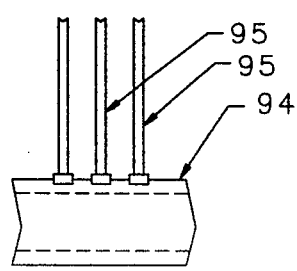
FIG. 10 is an elevational view of the assembly shown in FIG. 9.

In FIGS. 9 and 10 there is shown an alternative design wherein a tubular support and manifold member 94 supports a plurality of vertically disposed filter elements 95 which extend upwardly from the manifold and support tube 94.

In the embodiments of the invention shown in FIGS. 4 through 10, the tubular support and manifold member is a ceramic tube. The filter elements 76, 93 and 95 are also ceramic members. Preferably, all of these members and particularly the filter elements themselves are a ceramic impregnated ceramic fibrous mat.

The support plate 20 and the support tubes 74, 92 and 94 as well as the grid 54 are preferably formed in the following manner. A mat-like skeletal for is made in a vacuum forming operation wherein an aqueous colloidal alumina or silica slurry of the binder and short random lengths of ceramic fibers are pulled by a vacuum onto a mold or mandrel. The skeletal form is then heat treated to dry the binder which thus binds the fibers together into the skeletal form. The form is then immersed in an alpha alumina and/or silica bath. Thereafter the form is again heat treated to provide a non-porous solid rigid member which is relatively light in weight when compared with a metal plate or tube comparable having a comparable bending strength at high temperatures.

The refractor fibers may be alumina silica, and if very pure, will have the following composition:

| | |
|---|---|
| $Al_2O_3$ | 48.2% |
| $SiO_2$ | 48.2% |
| $TiO_2$ | 1.1% |
| $Fe_2O_3$ | 0.5 |

Still purer aluminum oxide fibers having the following composition may, however, be used:

| | |
|---|---|
| $Al_2O_3$ | 94% |
| $SiO_2$ | 3% |

The binder may be either colloidal alumina or colloidal silica. If a colloidal silica is used with the less pure alumina silica fibers the skeletal form has the following composition:

| | |
|---|---|
| $Al_2O_3$ | 30.5% |
| $SiO_2$ | 67.7% |
| $TiO_2$ | 1.1% |
| $Fe_eO_3$ | 0.5% | after the skeletal form has been coated with alpha alumina or colloidal silica it is preferably dried at a temperature in the range of 1700 degrees F. to 2300 degrees F. At the higher temperatures the coating is converted to the mullite phase which increases its resistance to corrosive attack by the hot gasses during use of the filter element.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed is:

1. In a pressure filter of the type including a pressure tank in which at least one hollow ceramic filter element is positioned in said tank between an inlet to said tank and an outlet from said tank, the combination comprising
   a rigid ceramic support member mounted in said tank and separating said inlet from said outlet, said member having at least one of hole extending therethrough from one surface thereof to an opposite surface thereof,
   said filter elements being sealably mounted to said rigid ceramic member over said holes and extending from said one surface, and
   said inlet and said outlet opening into said tank on respective ones of said surfaces of said rigid ceramic member.
2. The combination according to claim 1 wherein
   said rigid ceramic member is a plate extending across said tank.
3. The combination according to claim 2 wherein
   said filter element and said plate have the same coefficient of expansion.
4. The combination according to claim 3 wherein
   said filter element and said plate are constituted by a ceramic impregnated ceramic fibrous mat.
5. The combination according to claim 1 wherein
   said rigid ceramic member is a vertically disposed tube, and
   said filter element lies in a horizontal plane and extends radially from said rigid ceramic member.
6. The combination according to claim 4 wherein
   said rigid ceramic member is a horizontally disposed tube, and
   said filter element lies in a vertical plane and extends perpendicularly from said tube.
7. The combination according to claim 6 wherein
   said filter element extends upwardly from said tube.
8. The combination according to claim 7 wherein
   said filter element extends downwardly from said tube.

* * * * *